(12) United States Patent
Nakamoto et al.

(10) Patent No.: US 6,870,286 B2
(45) Date of Patent: Mar. 22, 2005

(54) MOVING BODY DRIVE UNIT

(75) Inventors: Kazuo Nakamoto, Kanagawa (JP);
Mitsuo Oketani, Fukui (JP); Noriaki Kasai, Fukui (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 10/612,881

(22) Filed: Jul. 7, 2003

(65) Prior Publication Data

US 2004/0104694 A1 Jun. 3, 2004

(30) Foreign Application Priority Data

Jul. 8, 2002 (JP) .................................. 2002-198485

(51) Int. Cl.[7] .......................... H02K 11/00; H02K 41/00
(52) U.S. Cl. ......................................................... 310/12
(58) Field of Search .................................... 310/12–14

(56) References Cited

U.S. PATENT DOCUMENTS 6,097,318 A * 8/2000 Hagl et al. .................. 341/7
6,144,118 A * 11/2000 Cahill et al. ................ 310/12
6,496,273 B1 * 12/2002 Stimpson et al. ........... 356/614

FOREIGN PATENT DOCUMENTS

| JP | 5-346120 | 12/1993 |
| JP | 11-63966 | 3/1999 |

* cited by examiner

Primary Examiner—Thanh Lam
Assistant Examiner—Judson H. Jones
(74) Attorney, Agent, or Firm—McDermott Will & Emery LLP; Paul Devinsky

(57) ABSTRACT

A moving body drive unit includes a linear motor for imparting linear motion to a moving body, guide elements for non-contact guiding of the moving body with respect to a support body, a long scale (42) etched with gradations, a read head (41) for detecting position of the moving body by reading gradations of the scale without contacting the scale, a scale housing body (44) for housing the scale and the read head, attached to one of the moving body or the support body, and a scale cover (47), attached to the other one of the moving body or the support body. The scale housing body has an elongated opening (45) through which one of the scale or the read head can be inserted into the scale housing body, and a supply port (46) for introduction of compressed air. The scale cover forms an air chamber (49) sealing the elongated opening of the scale housing body in a non-contact manner with a microscopic gap (48). Compressed air is introduced from the supply port into the air chamber, and flows out from the microscopic gap between the scale housing body and the scale cover.

7 Claims, 3 Drawing Sheets

MOVING BODY DRIVE UNIT

FIELD OF THE INVENTION

The present invention relates to a moving body drive unit using a combination of hydrostatic air bearings and a linear motor, and having infinitesimal sliding resistance.

BACKGROUND OF THE INVENTION

Machine tools that improve positioning accuracy by driving moving bodies such as a table and bed in a non-contact manner using a linear motor at the same time as guiding the moving body in a non-contact manner using hydrostatic air bearings, are known. These types of machine tools are used, for example, in order to manufacture dies for components of optical equipment requiring extreme degrees of miniaturization. They are also used in the fine manufacture of diffraction gratings for semiconductor lasers on the surface of a substrate formed from high hardness materials using a diamond tool. Mechanical methods using machine tools have advantages over chemical methods such as photoetching, namely that it is possible to repeatedly manufacture a diffraction grating having excellent durability. However, in order to mechanically manufacture a diffraction grating having groove spacing of less than 1 µm, there is a need for a higher precision machine tool provided with a positioning device capable of positioning in sub-micrometer or nanometer units.

A non-contact type position detection element is desired in a high precision machine tool to measure displacement amount of a moving body without imparting resistance to the movement of the moving body. Such a type of position detection element can utilize the advantages of a machine tool having a combination of hydrostatic air bearings and linear motor, namely infinitesimal frictional resistance. Non-contact type position detection elements mainly used in machine tools are, for example, optical linear encoders and magnetic linear encoders. These linear encoders comprise an elongated sheet scale having engraved gradations of the same pitch, and a read head for optically or mechanically reading gradations on the scale. One of either the head or the scale is attached to the moving body, and the other is attached to a support body. The support body is, for example, a bed and column for supporting the moving body using hydrostatic air bearings.

A higher precision machine tool is provided with a linear encoder having lattice gradations on a finer pitch. If the resolution of the linear encoder is made higher, even a small amount of microscopic dust and chips etc., attaching to the scale will have a more than negligible effect on the high position accuracy. There is a possibility that attachment of dust may damage the scale surface. This causes errors in detection due to variation in the amount of transmitted or reflected light detected by a read head of an optical linear encoder.

Japanese Patent Laid-open No. 11-063966 discloses a magnetic linear encoder having a scale and a read head arranged inside a long metal case. The case has a cross section that is U-shaped, open at the bottom, and dust is prevented from getting into the inside of the case by blocking off the open surface of the case with a rubber dust lip.

DISCLOSURE OF THE INVENTION

If the encoder disclosed in Japanese Patent Laid-open No. 11-063966 is fitted to a high precision machine tool provided with linear motors and hydrostatic air bearings, the advantage of non-contact will be reduced because the dust lip generates sliding resistance. The object of this invention is to provide a moving body drive unit provided with a non-contact type position detecting element where dust does not become attached to the scale, without reducing the advantage of a high precision moving body drive unit having infinitesimal sliding resistance due to linear motors and hydrostatic air bearings. Another object is to provide a machine tool provided with a high precision drive unit capable of positioning in sub-micrometer or nanometer units.

According to the present invention, a moving body drive unit comprises:

a linear motor for imparting linear motion to a moving body, guide means for non-contact guiding of the moving body with respect to a support body, an elongated scale etched with gradations, a read head for detecting position of the moving body by reading gradations of the scale without contacting the scale, a scale housing body for housing the scale and the read head, attached to one of the moving body or the support body and having an elongated opening through which one of the scale or the read head can be inserted into the scale housing body, and a supply port for introduction of compressed air, and a scale cover, attached to the other one of the moving body or the support body, forming an air chamber by sealing the elongated opening of the scale housing body in a non-contact manner with a microscopic gap.

With this structure, compressed air is introduced from the supply port into the air chamber, and flows out from the microscopic gap between the scale housing body and the scale cover, which means that dust is prevented from infiltrating into the air chamber and becoming attached to the scale.

It is preferable that the scale housing body is attached to the support body, and the read head is supported on the scale housing body. It is preferable that the scale cover is attached to the moving body, and the scale is held on the scale cover.

Also, preferably the support body is made up of a bed base and a support platform standing upright from the bed base, the moving body is a table capable of moving horizontally, and the scale is arranged between the table and the support platform.

It is preferable that the guide means includes two bearing guides parallel to each other and fixed to the support platform symmetrically about a vertical center line of the table, and a pair of hydrostatic air bearings forming bearing clearances in each bearing guide and fixed to the table.

It is further preferable that the linear motors are provided below each of the hydrostatic air bearings at an outer side of the support platform.

Also, the present invention is directed to a machine tool provided with a first drive unit having a linear motor for causing movement of a table on which a workpiece is mounted in a horizontal axis direction and a bearing guide for guiding the table in a non-contact manner, and a second drive unit having a linear motor for causing movement of a Z axis slider on which a tool is mounted in a vertical Z axis direction and a bearing guide for guiding the Z axis slider in a non-contact manner, wherein the first drive unit includes an elongated scale etched with gradations, a read head for detecting position of the table by reading the gradations of the scale without contacting the scale, a scale housing body for housing the scale and the read head, having an elongated opening through which one of the scale or the read head can be inserted into the scale housing body, and a supply port for introduction of compressed air, and a scale cover forming an air chamber by sealing the elongated opening in a non-contact manner with a microscopic gap, and wherein the second drive unit includes an elongated scale etched with gradations, a read head for detecting position of the Z axis slider by reading the gradations of the scale without contacting the scale, a scale housing body for housing the scale and the read head, having an elongated opening through which one of the scale or the read head can be inserted into the scale housing body, and a supply port for introduction of compressed air, and a scale cover forming an air chamber by sealing the elongated opening in a non-contact manner with a microscopic gap.

Other and further objects and advantages of the present invention will be further understood and appreciated by those skilled in the art by reference to the following specification, claims and drawings.

DESCRIPTION OF THE PREFERRED EMBODIMENTS

A precision machine tool to which a moving body drive unit of the present invention is applied will now be described in detail with reference to the drawings.

Figure 1:
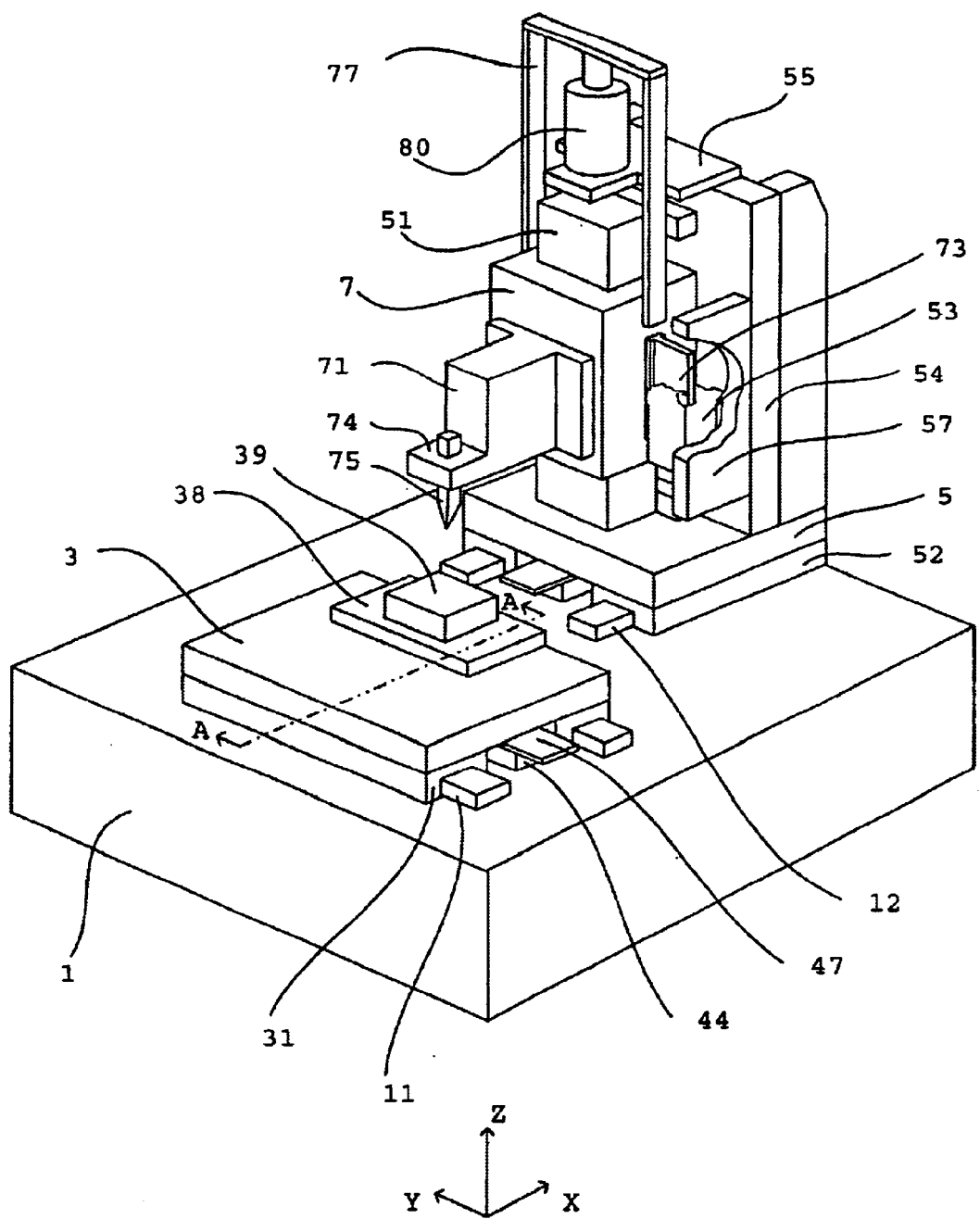
FIG. 1 is a perspective drawing of a precision machine tool to which the present invention is applied.

The precision machine tool shown in FIG. 1 is installed in a strictly temperature controlled clean room, and an operator remotely controls the machine from outside the room. A diamond tool 75 fitted to a chuck 74 is capable of movement in the direction of a horizontal X axis and a vertical Z axis, while a workpiece 39 is capable of movement in the direction of a horizontal Y axis orthogonal to the X axis. The chuck 74 is attached to a tool post 71 provided with a tool rotation device. The tool post 71 is fixed to a front surface of a Z axis slider 7 having a rectangular cross section. The Z axis slider 7 is made of a lightweight porous ceramics material with a small coefficient of thermal expansion and has a square cross section hollow section. A bearing guide 51 for guiding the Z axis slider 7 is fixed on an X axis table 5, and extends in the Z axis direction through the hollow section of the Z axis slider 7.

Figure 4:
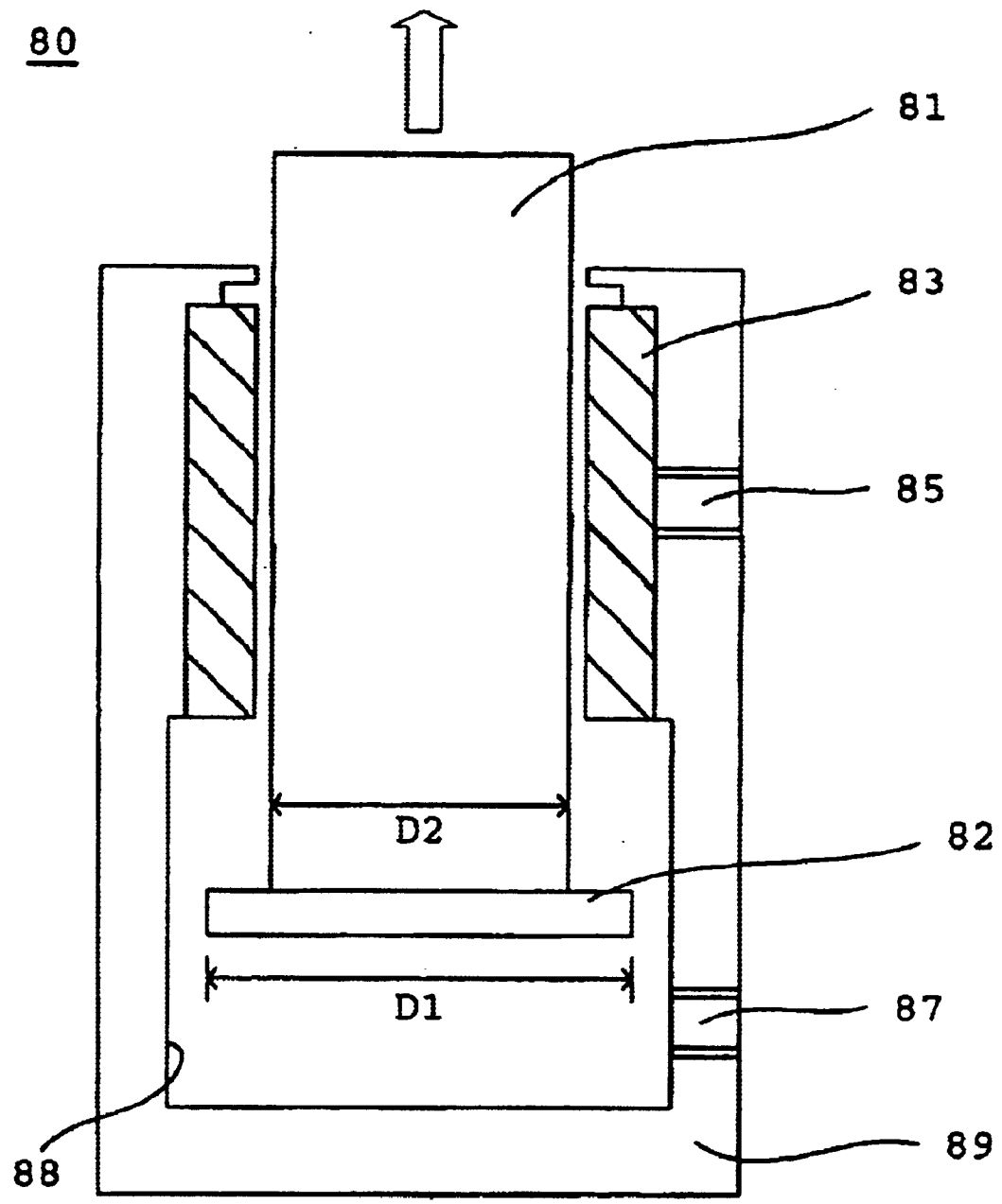
FIG. 4 is a cross sectional drawing of an air balancer in FIG. 1.

A linear motor imparting movement in the Z axis direction to the Z axis slider 7 comprises a mover 73 having a coil, and a stator 53 having a permanent magnet. The mover 73 is attached to both side surfaces of the Z axis slider 7 so that the center of thrust generated by the linear motor coincides with the axial center of the Z axis slider 7. The mover 73 is constructed by arranging a plurality of coreless coils on front and rear surfaces of a plate-shaped support member in the Z axis direction. In this way, magnetic attraction occurring between the mover 73 and the stator 53 is cancelled out. In FIG. 1, only one mover 73 is shown, and another mover 73 has been omitted. A stator 53 having magnets opposing coil rows through an air gap are attached to a bracket 57. The bracket 57 is supported on a column 54 standing upright on the X axis table 5. Only one each of the stator 53 and the bracket 57 are shown in the drawing, and parts of those are cut away. An air balancer 80 for generating a load to balance a weight acting on the Z axis slider 7 is provided. The air balancer 80 will now be described in detail with reference to FIG. 1 and FIG. 4. A piston rod 81 of the air balancer 80 is guided by a hydrostatic air bearing without touching inner walls of a cylinder 89 and can move vertically inside the cylinder 89. A connecting member 55 extends horizontally forwards from an upper end of the column 54, and the cylinder 89 is attached to a front section of the connecting member 55. A bracket 77 is attached to the Z axis slider 7, the piston rod 81 is supported on the bracket 77, and a lower end of the piston rod 81 is positioned inside a cylinder hole 88. The piston rod 81 is preferably provided so that it is coaxial with the Z axis slider 7.

A bearing bush 83, made of a porous carbon material and holding the piston rod 81, is glued to an inner wall of the cylinder 89. A supply port 85 for supply of compressed air to the bearing bush 83 is formed in the cylinder 89. A supply port 87 for supply of compressed air to the cylinder hole 88 is also formed in the cylinder 89. A discoid stopper 82 is attached to the lower end of the piston rod 81 so that the piston rod 81 does not come out of the cylinder 89. The diameter of the cylinder hole 88 is sufficiently larger than the diameter D1 of the stopper 82, and circulatory flow of air through a gap between the inner wall of the cylinder 89 and the stopper 82 is possible.

Compressed air is conveyed from a compressor to a suitable filter to remove dust, pressure adjusted to a set value of 5.0 kgf/cm$^2$ by a high relief air regulator, and supplied from the supply port 85 to the bearing bush 83. High pressure air that has passed through the bearing bush 83 is uniformly jetted to the peripheral surface of the piston rod 81. In this way, an air film is generated in a 5 μm bearing gap formed by the piston rod 81 and the bearing bush 83, and the piston rod 81 is hydrostatically held vertically. On the other hand, compressed air that has been reduced in pressure to 2.0 kgf/cm$^2$ by an appropriate high relief air regulator is applied to the supply port 87, and the air pressure inside the cylinder hole 88 is finally balanced to 3.0 kgf/cm$^2$. If the diameter of the piston rod 81 is made D2 (cm), thrust of $\pi/4 \cdot D2^2 \cdot 3$ is generated in the direction shown by the arrow in FIG. 4.

Figure 2:
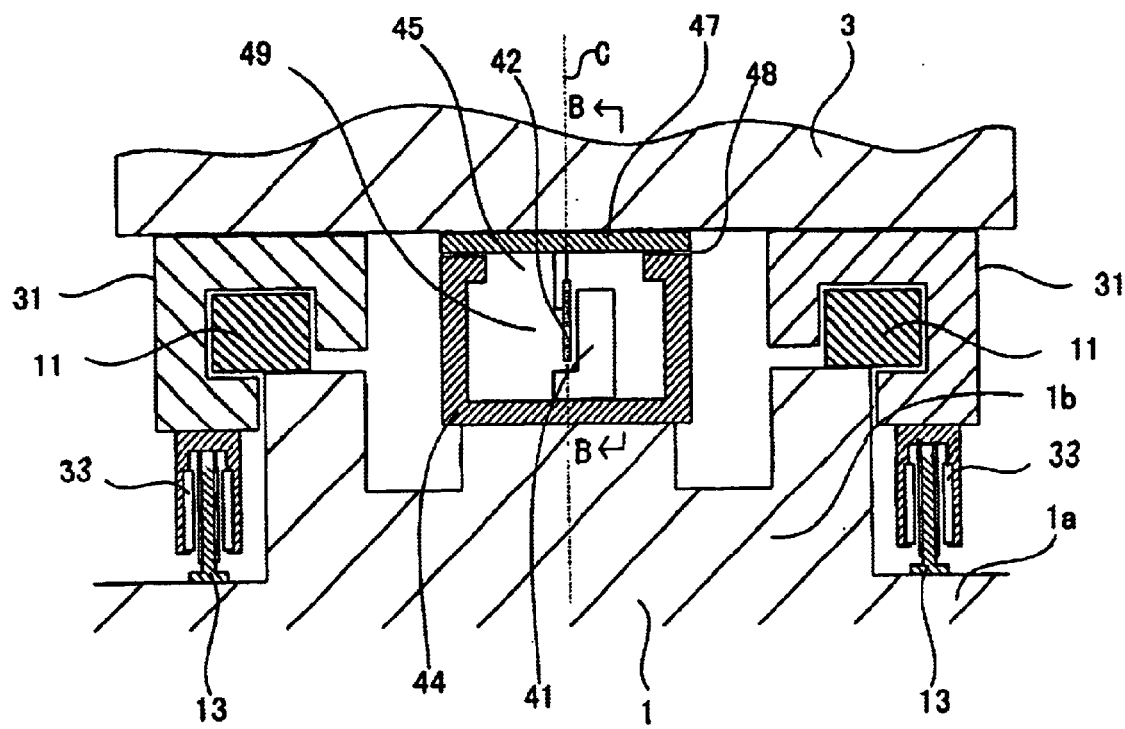
FIG. 2 is a cross sectional drawing of a moving body drive unit for the Y axis table in FIG. 1 looking along line A—A.

A moving body drive unit for the Y axis table 3 will now be described in detail with reference to FIG. 1 and FIG. 2. A workpiece 39 is fixed using an appropriate fastening device to a workpiece platform 38 mounted on the Y axis table 3. As is clearly shown in FIG. 2, the bed 1 is made up of a base 1a having a horizontal upper surface and a support platform 1b for supporting two bearing guides 11. The support platform 1b has a cross section that is vertical from the base 1a and extends in the direction of the Y axis.

Two rail shaped bearing guides 11, having a rectangular cross section and extending parallel to each other in the Y axis direction, are fixed to both ends of the support platform 1b. Only part of the lower surface of each of the bearings guides 11 is connected to the upper surface of the support platform 1b so that a bearing gap can be formed at the four side surfaces of the bearing guides 11. A pair of hydrostatic bearings 31 formed from a porous ceramics material are attached to the lower surface of the Y axis table 3, and act in cooperation with the two bearing guides 11 to guide the Y axis table 3 in a non-contact manner. Symbol C in FIG. 2 represents a vertical center line of the Y axis table 3 and also represents a vertical center line of the support platform 1b.

The two bearing guides 11 and the pair of hydrostatic bearings 31 are both arranged symmetrically about the center line C. The hydrostatic bearings 31 have such a cross section that it is possible to form a bearing gap at the four side surfaces of the bearing guides 11. The pressure of compressed air supplied to the bearing gap is maintained at 3.0 kgf/cm² by a precision air regulator, and can be independently set for each side surface.

A pair of linear motors for imparting movement in the Y axis direction to the Y axis table 3 are provided beneath the hydrostatic bearings 31 at an outer side of the support platform 1b. Stators 13 formed by arranging a plurality of coreless coils in the Y axis direction on front and rear surfaces of a plate-shaped support member are fixed to a horizontal upper surface of the base 1a at both outer sides of the support platform 1b. Movers 33 having magnets arranged facing the coil rows are fixed to lower surfaces of each of the hydrostatic bearings 31. Since the pair of linear motors are arranged symmetrically about the center line C, it is possible to move the Y axis table 3 in the Y axis direction with high precision. Also, since the coil assembly is provided on the bed 1, being a stationary body, power lines for supplying current to the coils do not interfere with smooth movement of the Y axis table 3.

The non-contact type position detection device for detecting the position of the Y axis table 3 will now be described in detail with reference to FIG. 2 and FIG. 3. With this embodiment, an optical encoder including a transparent glass scale 42 extending in the Y axis direction and a read head 41 is arranged between the Y axis table 3 and the support platform 1b. In order to ensure high detection precision, the elongated scale 42 is arranged directly below the Y axis table 3 on the center line C. A plurality of fine lattice gradations of repeating transparent sections and non-transparent sections, or reflecting and non-reflecting sections are formed on identical pitches on the surface of the scale 42 in the longitudinal direction. The read head 41 has light generating means for irradiating light to the scale 42, and a light receiving element for detecting light transmitted or reflected from the scale 42, and reads the lattice gradations of the scale 42 based on variations in amount of transmitted or reflected light. The read head 41 outputs a signal representing the displacement of the Y axis table 3 to an NC machine.

A scale housing body 44 for housing the scale 42 and the read head 41 is provided on the support platform 1b. The read head 41 is held in the scale housing body 44. An elongated opening 45 through which the scale 42 can be inserted into the scale housing body 44, and extending in the Y axis direction, is formed in the scale housing body 44. As is clearly shown in FIG. 2, the scale housing body 44 of this embodiment has an elongated opening 45 opening upwards and has a roughly U-shaped cross section. An elongated plate-shaped scale cover 47 for blocking the elongated opening 45 in a non-contact manner is attached to a lower surface of the Y axis table 3. In this way, a partitioned air chamber 49 is formed by the scale housing body 44 and the scale cover 47. The size of a gap 48 between the scale housing body 44 and the scale cover 47 is about 0.5 mm. The scale 42 is held at a lower surface of the scale cover 47.

As has been described above, the scale 42 is attached to the moving body, namely the Y axis table 3, via the scale cover 47, and the read head 41 is attached to a fixing section of the machine tool, namely the support platform 1b, via the scale housing body 44. Accordingly, since lead lines of the read head 41 are fixed, they do not interfere with smooth movement of the Y axis table 3 and no dust is produced.

Also, since piping for supplying compressed air to the scale housing body 44 is also fixed, there is a similar advantage.

Figure 3:
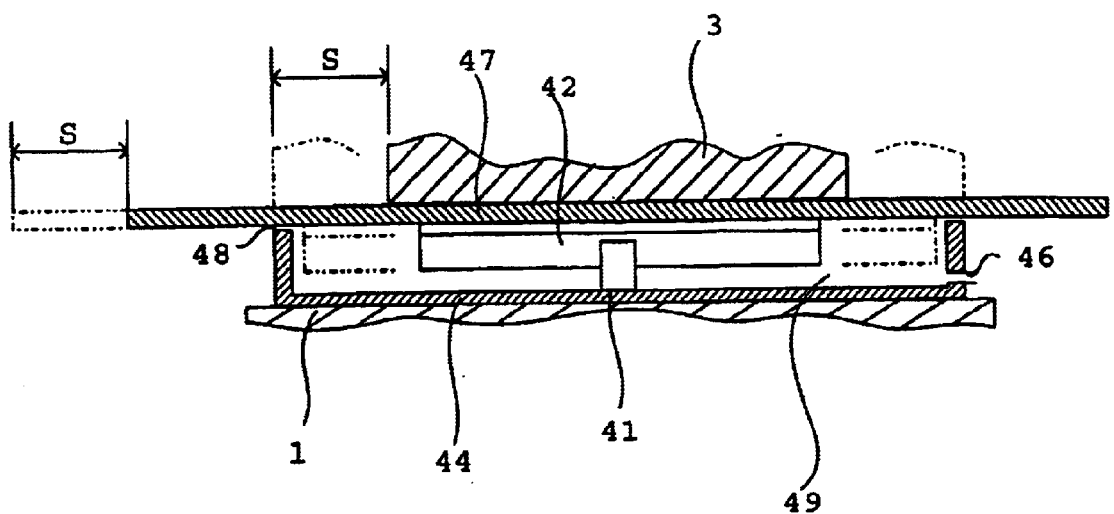
FIG. 3 is a cross sectional drawing of an optical linear encoder in FIG. 2 looking along line B—B.

The two dot dashed line in FIG. 3 shows the respective positions of the Y axis table 3, scale cover 47 and scale 42 when moving by distance S to the left of the drawing to reach the movement limit. Similarly, the single dot dashed line in FIG. 3 shows respective positions of the Y axis table 3 and scale 42 that have reached the right side movement limit. The scale housing body 44 has sufficient length to enable housing of the scale 42 at all positions the scale 42 is capable of moving to. The scale cover 47 has sufficient length to block off the elongated opening 45 of the scale housing body 44 with the microscopic gap 48, at any position on the Y axis.

A supply port 46 for introducing compressed air is formed in a lower part of one end of the scale housing body 44. Hydrostatic compressed air that has been supplied from a compressed air source through a suitable filter is supplied through the supply port 46 to the inside of the air chamber 49. Supplied compressed air is reduced in pressure to 2.0–3.0 kgf/cm² by a precision air regulator. In this way, the air pressure of the air chamber 49 is maintained higher than the atmospheric pressure outside, and air flows steadily to the outside of the air chamber from the gap 48. As a result, dust is prevented from infiltrating into the inside of the air chamber 49 where the scale 42 and read head 43 are arranged.

As has been described above, an optical linear encoder is provided between the Y axis table 3 and the support platform 1b, while on the other hand, a pair of linear motors are provided on both outer sides of the support platform 1b. In this way, the linear motors, which constitute heat sources that easily attract dust due to magnetic attraction force, are arranged apart from the scale 42. Accordingly, the elongated scale 42 can exhibit characteristics of being stable, and are unlikely to be subjected to undesirable effects due to thermal expansion and dust.

A moving body drive unit for the X axis table 5 has the same structure as the moving body drive unit for the Y axis table 3, and so detailed description will be omitted. As shown in FIG. 1, a pair of rail shaped bearing guides 12 extending in the X axis direction are fixed on the bed 1, and a pair of hydrostatic bearings 52 formed from a porous ceramics material, and acting in cooperation with the two bearing guides 12 to guide the X axis table 5 in a non-contact manner, are attached to the lower surface of the X axis table 5. Linear motors for imparting movement in the X axis direction to the X axis table 5 are not shown, but movers having permanent magnets are attached to lower surfaces of the hydrostatic bearings 52, and stators having coils are attached to the upper surface of the bed. Similarly to the scale 42 and read head 41 in FIG. 2, a non-contact type position detection element is attached below the X axis table 5. An air chamber is formed by a scale housing body, having a length corresponding to the range of movement of the X axis table 5, and a scale cover.

The non-contact type position detection element for detecting the position of the Z axis slider 7 is provided between the Z axis slider 7 and the column 54, and is arranged inside the air chamber formed by the scale housing body and the scale cover, similarly to the X axis and Y axis respectively. The read head is attached to the column 54 via the scale housing body, and the scale is attached to the Z axis slider 7 via the scale cover, passing through an elongated opening in the scale housing body.

As described above, with the moving body drive unit of the present invention, there is no stick-slip caused by contact resistance, even with a position detection element, and so fine precision positioning is made possible. Also, in a machine tool for moving a tool and a workpiece in a non-contact manner in horizontal and vertical directions using linear motors, and guiding the tool and the workpiece in a non-contact manner using hydrostatic air bearings, positioning in sub-micrometer or nanometer units is made possible by providing non-contact type position detection elements that are not subject to the effects of dust.

Further, since an elongated scale of an optical linear encoder is arranged apart from the linear motors, which constitute heat sources that are likely to attract dust due to magnetic attraction force, and is housed inside a container that air flows through, it can exhibit stable characteristics that are unlikely to be affected by thermal expansion.

While the present invention has been described in terms of the preferred embodiments, other variations which are within the scope of the invention as defined in the claims will be apparent to those skilled in the art.

What is claimed is:

1. A moving body drive unit comprises:
   a linear motor for imparting linear motion to a moving body, guide elements for non-contact guiding of the moving body with respect to a support body,
   an elongated scale etched with gradations,
   a read head for detecting position of the moving body by reading gradations of the scale without contacting the scale,
   a scale housing body for housing the scale and the read head, attached to one of the moving body or the support body and having an elongated opening through which one of the scale or the read head can be inserted into the scale housing body, and a supply port for introduction of compressed air, and
   a scale cover, attached to the other one of the moving body or the support body, forming an air chamber by sealing the elongated opening of the scale housing body in a non-contact manner with a microscopic gap.

2. The moving body drive unit according to claim 1, wherein the scale housing body is attached to the support body, and the read head is supported on the scale housing body and wherein the scale cover is attached to the moving body, and the scale is held on the scale cover.

3. The moving body drive unit according to claim 1, wherein the support body is made up of a bed base and a support platform standing upright from the bed base, the moving body is a table capable of moving horizontally.

4. The moving body drive unit according to claim 3, wherein the scale is arranged between the table and the support platform.

5. The moving body drive unit according to claim 3, wherein the guide elements include two bearing guides parallel to each other and fixed to the support platform symmetrically about a vertical center line of the table, and a pair of hydrostatic air bearings forming bearing clearances in each bearing guide and fixed to the table.

6. The moving body drive unit according to claim 3, wherein the linear motors are provided below each of the hydrostatic air bearings at an outer side of the support platform.

7. A machine tool comprising:
   a first drive unit having a linear motor for causing movement of a table on which a workpiece is mounted in a horizontal axis direction and a bearing guide for guiding the table in a non-contact manner; and
   a second drive unit having a linear motor for causing movement of a Z axis slider on which a tool is mounted in a vertical Z axis direction and a bearing guide for guiding the Z axis slider in a non-contact manner;
   wherein the first drive unit includes an elongated scale etched with gradations, a read head for detecting position of the table by reading the gradations of the scale without contacting the scale, a scale housing body for housing the scale and the read head, having an elongated opening through which one of the scale or the read head can be inserted into the scale housing body, and a supply port for introduction of compressed air, and a scale cover forming an air chamber by sealing the elongated opening in a non-contact manner with a microscopic gap; and
   wherein the second drive unit includes an elongated scale etched with gradations, a read head for detecting position of the Z axis slider by reading the gradations of the scale without contacting the scale, a scale housing body for housing the scale and the read head, having an elongated opening through which one of the scale or the read head can be inserted into the scale housing body, and a supply port for introduction of compressed air, and a scale cover forming an air chamber by sealing the elongated opening in a non-contact manner with a microscopic gap.

* * * * *